July 16, 1940.　　　T. T. ARDEN　　　2,207,771
THERMOELECTRIC SAFETY VALVE AND SWITCH
Filed April 29, 1936　　　3 Sheets-Sheet 1
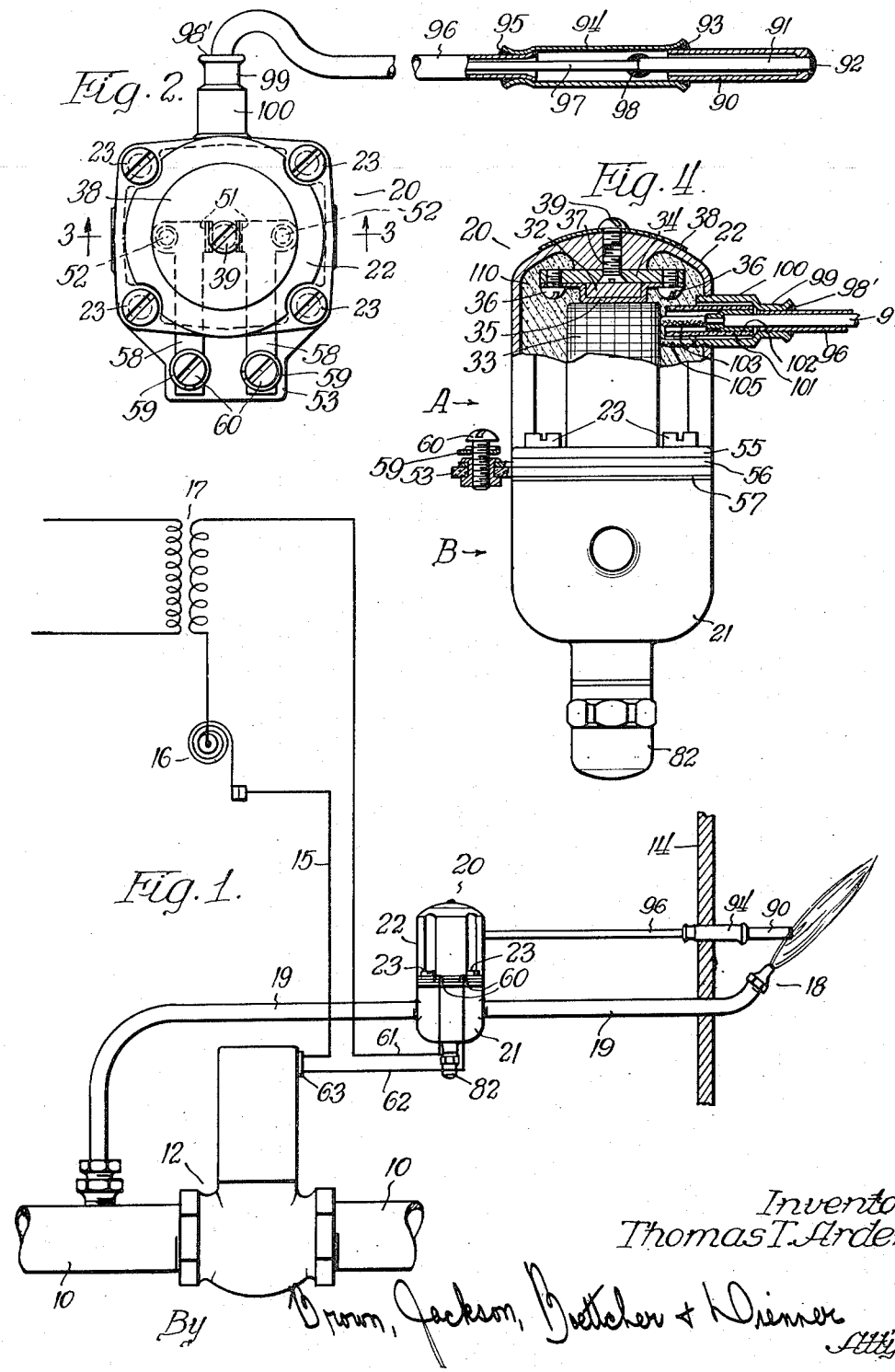
Inventor:
Thomas T. Arden,
By Brown, Jackson, Boettcher & Dienner
Attys.

July 16, 1940.  T. T. ARDEN  2,207,771
THERMOELECTRIC SAFETY VALVE AND SWITCH
Filed April 29, 1936  3 Sheets-Sheet 2

Inventor:
Thomas T. Arden.
By Brown, Jackson, Boettcher & Dienner Attys.

July 16, 1940.   T. T. ARDEN   2,207,771
THERMOELECTRIC SAFETY VALVE AND SWITCH
Filed April 29, 1936   3 Sheets-Sheet 3
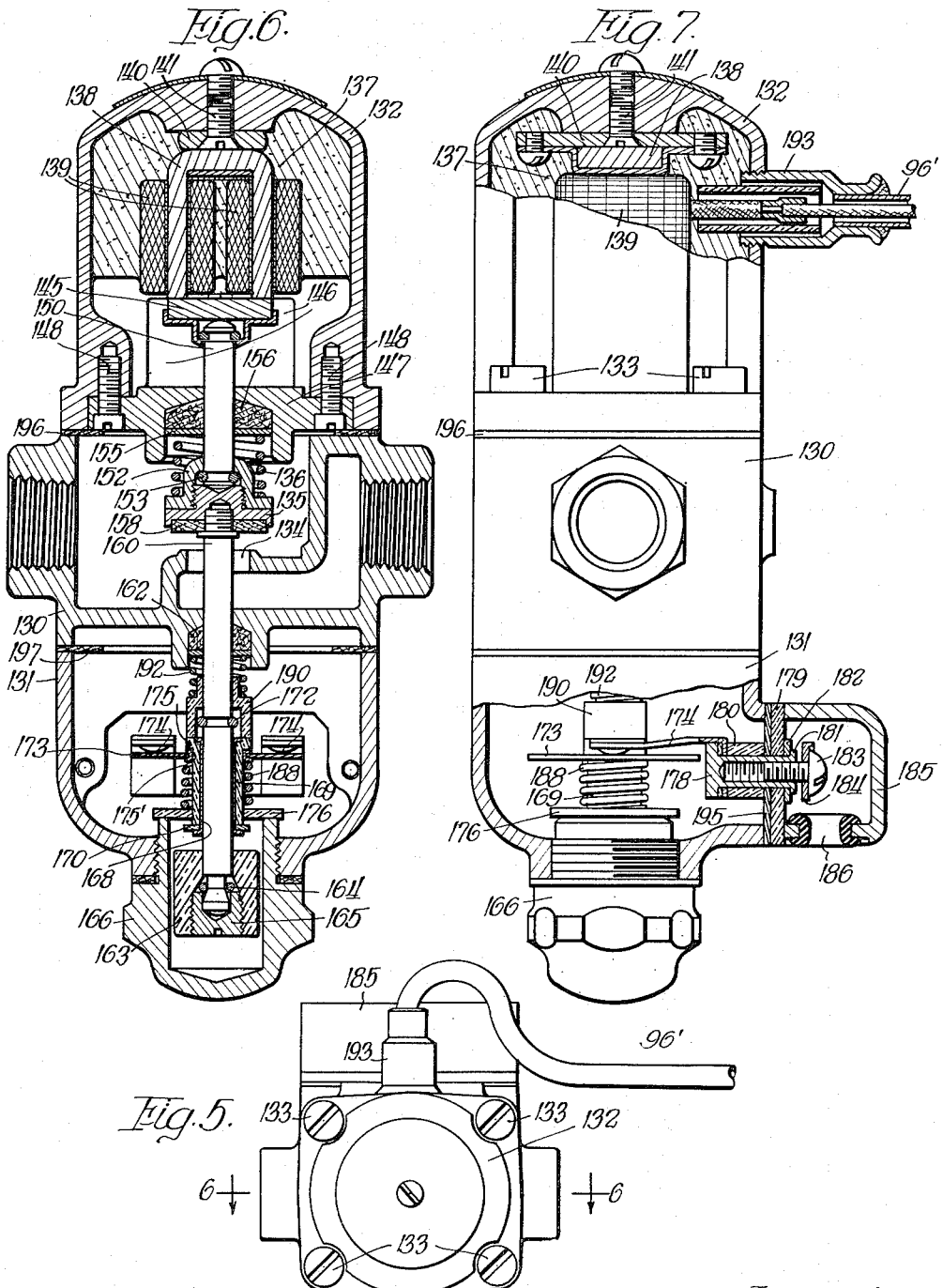
Inventor:
Thomas T. Arden.
By Brown, Jackson, Boettcher & Dienner Attys.

Patented July 16, 1940

2,207,771

UNITED STATES PATENT OFFICE 2,207,771

THERMOELECTRIC SAFETY VALVE AND SWITCH

Thomas T. Arden, Milwaukee, Wis., assignor to Milwaukee Gas Specialty Company, Milwaukee, Wis., a corporation of Wisconsin Application April 29, 1936, Serial No. 76,988

19 Claims. (Cl. 137—139)

This invention relates to a thermoelectric safety valve and switch and may be characterized as an improvement upon the devices shown and described in the copending applications of John H. Thornbery and Harold A. Mantz, Serial No. 743,382, filed September 10, 1934, and Serial No. 14,551, filed April 4, 1935.

In the first of the above mentioned copending applications a thermocouple responsive to the heat of the pilot flame energizes an electromagnet to hold a gas valve in open position as long as the pilot flame is burning. If the pilot flame is extinguished, the electromagnet is deenergized and the gas valve moves to closed position.

In the second application above mentioned, a thermocouple responsive to the heat of the pilot flame energizes an electromagnet to hold an electric switch closed so long as the pilot flame is burning. The switch controls a circuit for a remotely disposed electrically operated valve. If the pilot flame is extinguished the electromagnet is deenergized and the switch opens the circuit for the remotely disposed electrically operated valve and, as this circuit is opened, the remotely disposed valve moves to closed position.

The object of the present invention is to provide a thermoelectric safety valve and switch in which a thermocouple responsive to the heat of the pilot flame energizes an electromagnet, which electromagnet performs the dual function of holding the gas valve in open position and simultaneously the electric switch closed. If the pilot flame is extinguished, the electromagnet, which is energized by the thermocouple, is deenergized and the switch is opened and the gas valve moved to closed position.

By the dual function thus performed the device is adapted for controlling a valve which may be disposed in the gas supply line to the pilot device and simultaneously an electric circuit for a remotely controlled valve which may be disposed in the main gas supply line to the burner.

It is to be understood, however, that the switch of the present device may, within the scope of my present invention, control electric circuits for other or equivalent devices and that the valve of the present device may be arranged elsewhere than in the gas supply line to the pilot device.

Another object is to provide a combined thermoelectric valve and switch in which the switch and electromagnet will not be exposed to the gas, the flow of which is controlled by the valve, and in which at the same time the switch will be in close proximity to the valve, where it may be held closed by the electromagnet, which is energized by the thermocouple and which serves to hold the valve open.

Another object is to so combine the valve and switch means of the thermoelectric device that a single resetting device may be employed for resetting the valve to open position and the switch to closed position, and to provide a single resetting device for this purpose.

According to one embodiment of the invention, the device is a two chamber device with the valve operable in one chamber and the switch and electromagnet disposed in the other chamber.

Another embodiment of the invention is a three chamber device with the switch disposed in one chamber, the valve operable in the second chamber, and the electromagnet disposed in the third chamber.

Further objects and advantages of the invention will be apparent from the following detailed description, taken in conjunction with the accompanying drawings, in which:

Figure 1 is a fragmentary and more or less diagrammatic view showing an embodiment of the present invention in a pilot burner and main burner gas supply system;

Figure 2 is a top plan view of the thermoelectric safety valve and switch with the connected thermocouple partially in section;

Figure 4 is an elevational view partially in section, looking from the right-hand side of Figure 2;

Figure 5 is a top plan view of a modified form of thermoelectric safety valve and switch embodying the present invention;

Figure 6 is a vertical section taken on the line 6—6 of Figure 5; and

Figure 7 is an elevational view, partially in section, looking from the right hand side in Figure 5.

Figure 3:
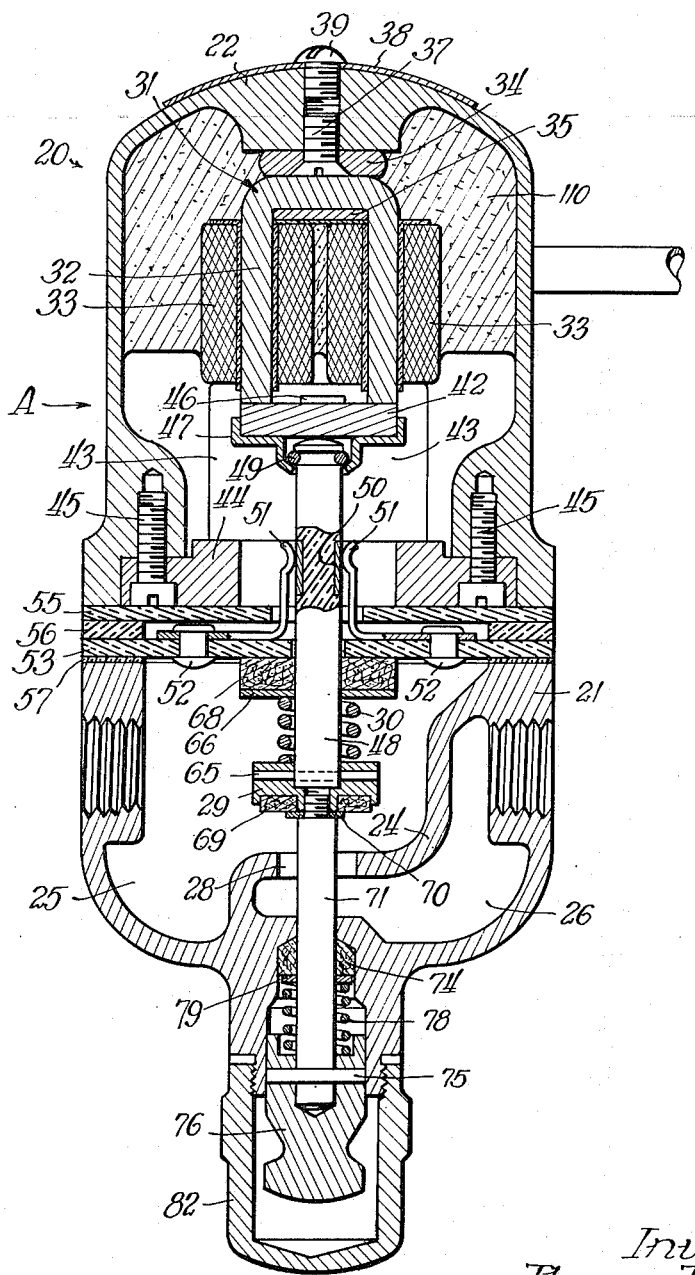
Figure 3 is a vertical section on an enlarged scale, taken on the line 3—3 of Figure 2.

Referring to the drawings, the pipe 10, which may be the gas supply pipe for the main burner (not shown) is provided with an electrically operated valve 12 of a type well known in the art.

The heater, appliance, or the like, is diagrammatically indicated at 14, and the main burner, which may be associated therewith in any suitable or preferred manner, may be controlled by the valve 12. This valve has electrically controlled mechanism connected into an electric circuit 15 which may be provided with a thermostat 16 to be opened or closed in accordance with the temperature of the room heated by the heater, where the heater is a room heater, or the thermostat 16 may be arranged to be opened and closed in accordance with the temperature of the water in the tank, where the heater is a water heater, or otherwise as desired. The circuit 15 may include the secondary winding of a transformer 17, which may be connected to a suitable source of current.

Associated with the main burner in the usual or in any suitable or preferred manner, is a pilot burner 18 which is intended to remain lighted and which may be of any suitable construction. This pilot burner 18 is supplied with fluid fuel by a tube 19 connected to the pipe 10 ahead of the valve 12.

The thermoelectric safety valve and switch shown in Figures 1 to 4 inclusive, is indicated in its entirety at 20, and is shown interposed in the fuel supply tube 19 for the pilot burner 18. It comprises a lower valve casing 21 and a hood 22. These two parts are held together by screws 23.

The valve casing is hollow and has a partition wall 24 dividing the interior thereof into an inlet chamber 25 and an outlet chamber 26. The tapped inlet opening at the inlet chamber is adapted to receive the gas inlet pipe and the tapped outlet opening at the outlet chamber is adapted to receive the gas outlet pipe which extends, for example, to the pilot burner 18. Formed in the partition wall 24 is an opening 28 surrounded by a valve seat against which a valve member 29 is resiliently pressed by a compression spring 30 when the electromagnet, indicated in its entirety at 31, is deenergized as will hereinafter appear.

The electromagnet 31 is disposed within the hood 22 and comprises a U-shaped magnet frame 32 provided about each of its legs with a coil 33. The magnet frame 32 is held rigidly to a magnet mounting plate 34 by means of a bracket 35 which is secured to the plate 34 by screws 36. The plate 34 is, in turn, rigidly secured to the hood 22 by a screw 37. A name plate 38 is secured etxernally to the top of the hood by a screw 39.

The magnet armature 42 is adapted to have engagement with the end portions of the U-shaped magnet 32. This armature is guided for reciprocatory movement within upright guide lugs 43 on an armature guide 44 which is secured to the hood 22 by screws 45. The armature 42 has attached thereto, by upwardly extending bent-over portions 46, a cradle 47 which, in turn, is connected to the upper end of the fiber valve stem 48 by means of a U-washer 49 engaging in a groove in the upper end of the stem 48 and cooperating with the inturned lower end of the cradle 47. A limited universal connection is thus provided between the armature 42 and the upper end of the stem 48.

The stem 48 has a brass contact ring 50 against which contact fingers 51 yieldingly press. These contact fingers 51 are riveted at 52 to a switch base 53 which extends out and is secured by the screws 23 between the valve casing 21 and the hood 22. Insulating discs 55 and 56 are interposed between the switch base 53 and the hood 22 and secured between the valve casing 21 and the hood, the upper disc 55 extending in over the adjacent portions of the contact fingers 51. A valve body gasket 57 is interposed between the lower disc 56 and the valve casing 21.

The contact fingers 51 have terminal extensions 58 (Fig. 2) which extend out and are connected to terminal washers 59 and terminal screws 60. The terminal screws 60 are connected by conductors 61 and 62 through the circuit 15 to suitable terminals 63 for the electrically controlled actuating mechanism within the housing carried by the electrically operated valve 12.

The valve disc member 29 is secured to the stem 48 by a diametrical pin 65. The spring 30 is coiled about the stem 48 and confined between the valve disc 29 and a valve stem washer 66 which has packing 68 above it so that gas cannot escape from the valve casing 21 into the hood 22. The under surface of the valve disc 29 has a gasket 69 clamped in a recess in the disc and between the disc and a washer 70, by the resetting stem 71, the upper reduced end of which is threaded into the valve disc 29, as shown.

The resetting stem 71 extends downwardly through the opening 28 and out through the bottom of the valve casing 21 into a tubular boss on the bottom of the casing. Suitable packing is provided at 74 to seal the valve casing against gas leakage along the stem 71. Fixed upon the lower end of the stem 71 by a pin 75 is a resetting button 76. This button is slidable in the recess in the boss on the bottom of the valve casing and a compression spring 78 is coiled about the stem 71 and confined between the button 76 and the stem packing washer 79. The upper end of the button 76 may be recessed to receive the lower end of the spring 78 as shown. In order to prevent unwarranted actuation of the button 76 a closure member or cap 82 is threaded upon the boss at the bottom of the casing 21 and over the button 76 completely to enclose the button. In order to reset the valve disc and switch it is necessary to remove this cap 82.

A suitable thermocouple, comprising an outer tubular element 90 which, at one end, is welded to the inner element 91 as shown at 92, for the purpose of providing a hot junction between the two members, is disposed with the junction in proximity to the pilot flame, as shown more or less diagrammatically in Figure 1, so as to be responsive to the heat of the pilot flame. The external element 90 is joined at its opposite end, as by welding or the like, at 93, to a tubular couple connector 94. The opposite end of the tubular connector, which may be formed of copper, or other suitable metal, is joined as by welding or the like at 95, to the adjacent end of the lead tube 96. Extending through the tube 96 is the lead wire 97 which may be an insulated wire and which, within the connector 94, is joined at 98 to the internal element 91 of the thermocouple. The thermocouple elements 90 and 91 are formed of dissimilar metals such as "Constantan" and "Chromel," "Chromel" and "Copel," or any other dissimilar metals which, when heated at the junction therebetween, are adapted to produce a thermoelectric current.

The lead tube 96, which may be formed of copper, extends to the thermoelectric valve and switch device 20 and is secured, as by means of a welded joint at 98', within a reduced portion 99 of a connector 100 which is threaded into and electrically contacts the hood 22. Within the connector 100 is provided an insulating sleeve 101 disposed about the adjacent end of the conductor 97 and enclosing the connector 102 between the conductor 97 and the terminal conductor 103 of one of the coils 33. The other coil terminal is connected to the connector 100 as shown at 105. Thus a circuit is completed through the coils 33 about the legs of the magnet 32 and the conductors 96 and 97 leading to the hot thermocouple junction.

The operation of the device shown in Figures 1 to 4, inclusive, is as follows:

When the pilot flame 18 is burning the heat of the pilot flame upon the junction 92 of the thermocouple produces a thermoelectric current in the coils 33 of the electromagnet 31. The magnet frame 32 and armature 42 are preferably formed of "Permaloy," "Hypernik," or a similar alloy of relatively low magnetic reluctance and, as a result, the relatively weak thermoelectric current produces a magnetic field in the magnet frame and armature of sufficient strength so that when the magnet armature is placed in contact with the ends of the magnet frame by pushing the reset button 76, the magnetic attraction between the magnet frame and the armature holds the armature in raised position against the frame with a force greater than the force exerted by the springs 30 and 78, thereby holding the contact ring 50 in contact with the contacts 51 and the valve member 29 in open position so long as the pilot flame is burning.

If the pilot light goes out, the thermoelectric current through the electromagnet 31 ceases and the springs 30 and 78 move the valve member 29 to closed position, and, simultaneously, the contact ring 50 downwardly into open position out of engagement with the contacts 51. The operation of the springs in closing the valve and opening the switch is aided by gravity if the device is installed vertically, as shown, but the springs are preferably of sufficient tension to close the valve and open the switch without the aid of gravity, whereby the device may be installed in any desired position. The springs also assure detachment of the armature from the electromagnet upon deenergization of same and notwithstanding any residual magnetization therein. The closing of the valve 29 shuts off the supply of gas to the pilot burner and the opening of the switch opens the circuit 15 for the safety control valve 12, whereupon this valve moves to closed position to close off the supply of gas to the main burner.

The current produced by the thermocouple at the pilot tip 18 is not sufficient to energize the magnet sufficiently to draw the armature upwardly from its lowermost position and therefore the combined valve and switch is reset by removing the cap 82 and pushing the reset button 76 sufficiently to raise the armature 42 into contact with the magnet frame. The pilot can then be relighted, but the stem 71 must be held in the position to retain the armature against the electromagnet for a sufficient period to assure that the thermoelectric current has energized the electromagnet. The device is thereby reconditioned, and upon release of the resetting button the energization of the electromagnet by means of the thermocouple, when the thermocouple is responsive to the heat of the pilot flame, will hold the valve 29 open and the switch closed as long as the pilot flame is burning.

After the connections are made between the electromagnet and the tube 96 and conductor 97, and between the electromagnet and the connector 100, the space between the electromagnet and the upper portion of the hood is filled with sealing compound, indicated at 110, for holding the parts in position and sealing the same in place. This compound also seals the hood against the leakage of any gas which may leak up into the hood past the valve stem 48.

The modified form of thermoelectric safety switch and valve shown in Figures 5 to 7, inclusive, comprises an intermediate valve casing 130, a lower switch casing 131, and an upper electromagnet enclosing hood 132. These parts are held together by screws 133.

The intermediate valve casing 130 is hollow and, as in the preceding embodiment, has a partition wall dividing the interior thereof into an inlet chamber and an outlet chamber. The tapped inlet opening at the inlet chamber is adapted to receive the gas inlet pipe, and the tapped outlet opening at the outlet chamber is adapted to receive the gas outlet pipe which extends, for example, to the pilot burner. Formed in the partition wall is a valve opening 134 surrounded by a valve seat against which a valve member 135 is resiliently pressed by compression spring 136 when the electromagnet, indicated at 137, is deenergized.

The electromagnet 137 is disposed within the hood 132, and, as in the preceding embodiment, comprises a U-shaped magnet frame 138 provided about each of its legs with a coil 139. The magnet frame is held rigidly to a magnet mounting plate 140 by means of a bracket which is secured to the plate by screws, as shown. The plate 140 is, in turn, rigidly secured to the hood 132 by a screw 141. A name plate may be provided, as before.

The magnet armature 145 is adapted to have engagement with the end portions of the U-shaped magnet 138. This armature is guided, as before, for reciprocatory movement within upright guide lugs 146 on an armature guide 147 which is secured to the hood 132 by screws 148. The armature 145 has attached thereto by upwardly extending bent-over portions a cradle which, in turn, is connected to the upper end of the valve stem 150, preferably in a manner to provide limited universal connection as described in connection with the preceding embodiment of the invention.

The valve disc member 135 is secured to the lower end of the stem 150 by a cradle 152 which has an inturned upper end which cooperates with a U-shaped retainer 153 engaging in a groove in the lower end of the stem 150. A limited universal connection is thus provided between the valve member 135 and the lower end of the stem 150. The spring 136 is coiled about the stem 150 and confined between the flanged margin of the cradle 152 and a valve stem washer 155 which has packing 156 disposed above it and in a recess in the armature guide so that gas cannot escape from the valve casing 130 into the hood 132. The under surface of the valve disc 135 has a gasket 158 clamped in a recess in the valve disc and between the disc and a washer by the resetting stem 160, the upper reduced end of which is threaded into the valve disc 135 as shown.

The resetting stem 160 extends downwardly through the valve opening 134 down through an opening in the bottom of the valve casing 130, through switch casing 131, and out through an opening in the bottom of the switch casing. Suitable packing is provided at 162 to seal the valve casing against gas leakage along the stem and into the switch casing. Fixed upon the lower end of the stem 160 is a resetting button 163 secured upon the stem by a retainer spring 164 and a screw 165. In order to prevent unwarranted actuation of the button 163, a closure cap 166 is threaded into the opening in the bottom of the switch casing and over the button 163 completely to enclose the button. This cap 166 is removed to reset the valve as in the preceding embodiment of the invention and the switch is reset by resetting the valve and replacing the cap 166 to engage its upper end with the disc 176 and press the contact disc 173 yieldingly against the contacts 174 through the spring 188.

The stem 160 is slidable in an eyelet 168 which carries an insulating sleeve 169 and holds a washer 170 to the lower end of this sleeve. A ring 172 engages in a groove in the stem 160, and with the switch closed and the valve open this ring is positioned above the upper end of the sleeve 169 a distance less than the spacing of the valve 135 above its seat. A contact disc 173 for bridging and connecting the contact fingers 174 has a central opening provided with an eyelet with which a shoulder 175 on the sleeve 169 is adapted to cooperate in the downward movement of the sleeve 169, which sleeve is slidable in an insulating disc 176 which seats upon the upper end of the tubular extension of the cap 166.

The contact fingers 174 have down-turned ends (Figure 7) connected electrically to terminal bushings 178 and secured mechanically by said terminal bushings to an insulating terminal base 179 secured over a lateral opening in the switch casing 131. Spacers are provided at 180, and the tubular extensions of the bushings 178 are headed at 181 with a washer 182 interposed between the base 179 and each of these heads 181. Terminal screws 183 are threaded into each of the bushings 178, and these screws are provided with terminal washers 184. A terminal cover 185 is suitably secured by means of screws or the like (not shown) over the terminal screws 183 and the outer ends of the terminal bushings. The bottom of the cover 185 has openings provided with insulating grommets 186 through which the conductors corresponding, for example, with the conductors 61 and 62 of Figure 1 are led into the terminal cover 185 and connected to the respective terminal screws.

A coiled spring 188 surrounds the insulating sleeve 169 and is interposed between the contact disc 173 and, specifically, between the eyelet 175' thereof and the insulating disc 176. This spring 188 holds the contact disc 173 yieldingly against the contact arms 174 when the device is in the position shown in Figure 6, and at the same time permits the armature 145 to be pressed and held firmly against the ends of the legs of the magnet frame 138 without depending solely upon the yieldability of the contact arms 174. An insulating bushing 190, enlarged to surround the retainer ring 172, is provided upon the stem 160, and a coiled spring 192 is interposed between a shoulder on this bushing and a washer pressed against the packing 162.

The thermocouple (not shown) is substantially as shown and described in connection with the preceding embodiment. Suffice it to say that the lead tube is shown at 96' and that the connections at 193 are substantially as described in connection with the preceding embodiment of the invention.

The operation of the device shown in Figures 5, 6 and 7 is as follows:

When the pilot flame, corresponding to the flame 18 of the preceding embodiment, is burning, the heat of the pilot flame upon the junction of the thermocouple produces a thermoelectric current in the coils 139. The thermoelectric current produces a magnetic field in the magnet frame and armature of sufficient strength so that, when the magnet armature is placed in contact with the ends of the magnet frame by pushing the reset button 163, the magnetic attraction holds the armature in raised position against the frame with a force greater than the force exerted by the spring means, thereby holding the contact disc 173 in contact with the contact arms 174 and the valve 135 in open position so long as the pilot flame is burning.

If the pilot light goes out, the thermoelectric current through the electromagnet 137 ceases, and the springs 136 and 192 move the valve member 135 to closed position and simultaneously the contact disc 173 downwardly into open position out of engagement with the contact arms 174. The closing of the valve shuts off the supply of gas to the pilot burner, and the opening of the switch opens the circuit for the safety control valve, whereupon this valve moves to closed position to close off the supply of gas to the main burner.

In the downward movement of the stem 160, the retainer ring 172 engages the upper end of the eyelet 168 or insulating sleeve 169 and moves the same downwardly. Upon this downward movement of the sleeve the shoulder 175 thereof engages the eyelet 175' or the contact disc 173 and moves the same downwardly into open position out of engagement with the contact arms 174 against the tension of the spring 188.

In resetting the device, the retainer ring 172 moves upwardly with the stem 160. The contact 173 is not engaged with the contacts 174, however, until the cap 166 is applied to position enclosing the resetting button. When thus applied, the upper end of the cap engages the disc 176 and presses the contact 173 into engagement with the contacts 174 yieldingly through the spring 188. A gasket 195 is preferably provided between the terminal base 179 and the switch casing 131, and gaskets 196 and 197 are preferably provided between the valve casing 130 and the hood 132, and between the valve casing 130 and the switch casing 131, respectively.

It will be apparent from the foregoing description that the device of the present application is of relatively simple construction, is composed of relatively few parts which can be easily manufactured and assembled and which are advantageously related to each other; also a device which is easy of installation, and, working on the principle of a thermoelectric couple, is reliable and has advantages in operation. The present device also provides for controlling a gas valve and for simultaneously controlling an electric circuit.

It is to be understood that the invention is not to be limited to the embodiment illustrated and described, but is capable of a wide variety of embodiments within the scope of the appended claims, and that changes may be made in the details of construction, arrangement and relation of the parts. Furthermore, while the invention has been illustrated and described as employed in conjunction with a pilot light, it will be apparent that the invention may also be used as a safety device in connection with other devices, as, for example, the thermoelectric couple could be subjected to the heat of a main burner where it is desired that the gas valve be closed whenever the main burner goes out. Furthermore, the valve casing of the present device may be connected into other gas lines than the pilot supply line as shown, and the switch may control other circuits than a circuit for a remotely disposed electrically operated valve in the gas line for the main burner.

I claim:

1. In combination, a valve casing having an inlet and an outlet, a hood on said casing, an electromagnet in said hood, a thermocouple responsive to the heat of a flame and connected to said electromagnet to energize same as long as said flame is burning, a switch base clamped between said valve casing and said hood, spaced contacts carried by said switch base, an armature disposed in the hood and adapted to be held to said electromagnet as long as the flame is burning, a valve stem carried by said armature and extending into the valve casing, a contact on said stem for bridging said first contacts when said armature is held to said electromagnet, a valve carried by said stem and disposed in said valve casing for controlling communication between the inlet and outlet of said casing, a washer on said stem, a spring between said washer and said valve member for closing said valve member and simultaneously moving the contact on the stem out of bridging engagement with said first contacts upon extinction of the flame, and packing between said washer and said switch base and about said stem for sealing the valve casing against valve leakage into the hood along said stem.

2. In combination, a valve casing having an inlet and an outlet, a hood on said casing, an electromagnet in said hood, a thermocouple responsive to the heat of a flame and connected to said electromagnet to energize same as long as said flame is burning, a switch base clamped between said valve casing and said hood, spaced contacts carried by said switch base, an armature disposed in the hood and adapted to be held to said electromagnet as long as the flame is burning, a valve stem carried by said armature and extending into the valve casing, a contact on said stem for bridging said first contacts when said armature is held to said electromagnet, a valve carried by said stem and disposed in said valve casing for controlling communication between the inlet and outlet of said casing, a washer on said stem, a spring between said washer and said valve member for closing said valve member and simultaneously moving the contact on the stem out of bridging engagement with said first contacts upon extinction of the flame, packing between said washer and said switch base and about said stem for sealing the valve casing against valve leakage into the hood along said stem, a resetting stem secured to the valve stem and extending down to the bottom of the casing, and a resetting button on said last stem.

3. In combination, a valve casing, a hood on said casing, an electromagnet in the hood, an armature for said electromagnet, a valve stem carried by said armature, a valve member carried by said stem and operable in the valve casing, a switch base, switch contacts mounted upon said base and disposed in said hood, a contact carried by said stem and adapted for bridging said first contacts, and means for sealing said valve casing against leakage of gas into said hood.

4. In combination, a valve casing, a hood on said casing, an electromagnet in the hood, an armature for said electromagnet, a valve stem carried by said armature, a valve member carried by said stem and operable in the valve casing, a switch base, switch contacts mounted upon said base and disposed in said hood, a contact carried by said stem and adapted for bridging said first contacts, means for sealing said valve casing against leakage of gas into said hood, a resetting stem secured to the lower end of the valve stem, a resetting button on said resetting stem, and a closure member removably secured to the valve casing and enclosing said resetting button.

5. In combination, a valve casing, a hood on said casing, a switch base clamped between said casing and said hood, an armature operable within the hood, a valve stem carried by said armature and extending through the switch base into the valve casing, a valve member on said valve stem and operable in the valve casing, spaced switch contacts disposed within said hood and mounted on said switch base, and a bridging contact member carried by said valve stem and adapted for bridging sad first contacts when the valve member is in open position.

6. In combination, a valve casing, a hood on said casing, a switch base clamped between said casing and said hood, an armature operable within the hood, a valve stem carried by said armature and extending through the switch base into the valve casing, a valve member on said valve stem and operable in the valve casing, spaced switch contacts disposed within said hood and mounted on said switch base, a bridging contact member carried by said valve stem and adapted for bridging said first contacts when the valve member is in open position, and packing held to the switch base and about the valve stem for sealing the valve casing against gas leakage into the hood along said stem.

7. In combination, a valve casing, a switch casing sealed from said valve casing, an electromagnet casing also sealed from said valve casing, a valve operable in said valve casing, a switch operable in said switch casing, an electromagnet in said electromagnet casing, and a thermocouple connected to said electromagnet and adapted for simultaneously controlling said valve and said switch.

8. In combination, a valve casing having an inlet and an outlet, a hood on the top of said valve casing, an electromagnet in said hood, a thermocouple responsive to the heat of a flame and connected to said electromagnet to energize same as long as said flame is burning, a switch casing on the bottom of said valve casing, an insulating contact base secured to the side of said switch casing, contact arms secured to said base and extending into the switch casing, an armature disposed in the hood and adapted to be held to said electromagnet as long as the flame is burning, a valve stem carried by said armature and extending into the valve casing, a valve carried by said stem and operable in the valve casing, a stem coaxial with said first stem and extending into the switch casing, a contact member, means for yieldingly pressing said contact member into engagement with said contact arms, and means on said last stem for disengaging said contact member from said contact arms upon extinction of the flame.

9. In combination, a valve casing having an inlet and an outlet, a hood on the top of said valve casing, an electromagnet in said hood, a thermocouple responsive to the heat of a flame and connected to said electromagnet to energize same as long as said flame is burning, a switch casing on the bottom of said valve casing, an insulating contact base secured to the side of said switch casing, contact arms secured to said base and extending into the switch casing, an armature disposed in the hood and adapted to be held to said electromagnet as long as the flame is burning, a valve stem carried by said armature and extending into the valve casing, a valve carried by said stem and operable in the valve casing, a stem coaxial with said first stem and extending into the switch casing, a contact member, means for yieldingly pressing said contact member into engagement with said contact arms, means on said last stem for disengaging said contact member from said contact arms upon extinction of the flame, and a resetting button on the lower end of said last stem for resetting the armature in contact with the electromagnet, the valve in open position and said last means in position to permit said contact member to be yieldingly pressed into engagement with said contact arms.

10. In combination, an electromagnet comprising a magnet member having coil means therefor, a thermocouple responsive to the heat of a flame and connected to the coil means of said electromagnet to energize same when said flame is burning, an armature adapted to be held to said electromagnet when same is energized by said flame and movable to retracted position upon extinguishment of said flame, a valve adapted to be held in open position by said armature when the armature is held to said electromagnet by energization thereof by said thermocouple, an electric switch adapted to be held in closed position by said armature when the armature is held to said electromagnet by energization thereof by said thermocouple, said valve being moved to closed position and said switch opened by said armature when the armature moves to retracted position upon extinguishment of said flame, and means for resetting said armature to attracted position and operable simultaneously to close said switch and to move said valve to open position.

11. In combination, housing means having means dividing the interior thereof into a valve casing part and another part, said valve casing part having a fuel inlet and a fuel outlet, electric switch contact means in said other part and sealed against the fuel passing through said valve casing part, an electromagnet comprising a magnet frame and coil means therefor, a thermocouple responsive to the heat of a flame and connected to the coil means of said electromagnet to energize same when said flame is burning, an armature adapted to be held to said electromagnet when same is energized by said flame and movable to retracted position upon extinguishment of said flame, a plunger carried by said armature and adapted to be actuated to return said armature to the position in which it is held by said electromagnet, means within said valve casing part and actuated by said plunger for controlling the flow of fuel through said valve casing part, and switch contact means within the other housing part and actuated into and out of cooperation with said first switch contact means by said plunger.

12. In combination, an electromagnet, a thermocouple adapted to be subjected to the heat of a flame and connected in circuit with said electromagnet, an armature adapted to be held attracted to said electromagnet when said electromagnet is energized by the heat of the flame on the thermocouple and operable to retracted position upon extinguishment of the flame, a valve adapted to be held in open position by said armature when the armature is in attracted position and operable to closed position upon movement of the armature to retracted position, and a switch adapted to be held closed by said armature when the armature is in attracted position and operable to open position upon movement of the armature to retracted position.

13. In combination, an electromagnet, a thermocouple adapted to be subjected to the heat of a flame and connected in circuit with said electromagnet, an armature adapted to be held attracted to said electromagnet when said electromagnet is energized by the heat of the flame, a valve adapted to be held in open position by said armature when the armature is in attracted position, a switch adapted to be held closed by said armature when the armature is in attracted position, and spring means operable upon extinguishment of the flame for moving said armature to retracted position, said valve to closed position and said switch to open position.

14. In combination, an electromagnet, a thermocouple adapted to be subjected to the heat of a flame and connected in circuit with said electromagnet, an armature adapted to be held attracted to said electromagnet when said electromagnet is energized by the heat of the flame, a valve adapted to be held in open position by said armature when the armature is in attracted position, a switch adapted to be held closed by said armature when the armature is in attracted position, means operable upon extinguishment of the flame for moving said armature to retracted position, said valve to closed position and said switch to open position, and means for resetting said armature to attracted position and operable simultaneously to open said valve and to close said switch.

15. In combination, an electromagnet, a thermocouple adapted to be subjected to the heat of a flame and connected in circuit with said electromagnet to energize the same by the heat of the flame on the thermocouple, an armature adapted to be held attracted to said electromagnet when said electromagnet is energized by the heat of the flame on the thermocouple and operable to retracted position upon extinguishment of the flame, a controlling member having an operating position and a safety position, means for resetting said armature to attracted position and said controlling member to operating position, removable closure means for said last means, and means requiring said armature to be in attracted position and said closure to be in place to hold said controlling member in operating position.

16. In combination, an electromagnet, a thermocouple adapted to be subjected to the heat of a flame and connected in circuit with said electromagnet to energize the same by the heat of the flame on the thermocouple, an armature adapted to be held attracted to said electromagnet when said electromagnet is energized by the heat of the flame on the thermocouple and operable to retracted position upon extinguishment of the flame, a controlling member having an operating position and a safety position, means for resetting said armature to attracted position and said controlling member to operating position, removable closure means for said last means, and means requiring said armature to be in attracted position and said closure means to be in place to hold said controlling member in operating position, said controlling member being actuated to safety position by movement of said armature to retracted position when said closure means is in place and being disposed in safety position when said closure means is removed and said armature is in attracted position.

17. In combination, an electromagnet, a thermocouple adapted to be subjected to the heat of a flame and connected in circuit with said electromagnet to energize the same by the heat of the flame on the thermocouple, an armature adapted to be held attracted to said electromagnet when said electromagnet is energized by the heat of the flame on the thermocouple and operable to retracted position upon extinguishment of the flame, a controlling member having an operating position and a safety position, means for resetting said armature to attracted position and said controlling member to operating position, removable closure means for said last means, and a spring operative between said controlling member and said closure means for actuating said controlling member to operating position when the armature is in attracted position and the closure means is in place.

18. In combination, an electromagnet, a thermocouple adapted to be subjected to the heat of a flame and connected in circuit with said electromagnet to energize the same by the heat of the flame on the thermocouple, an armature adapted to be held attracted to said electromagnet when said electromagnet is energized by the heat of the flame on the thermocouple and operable to retracted position upon extinguishment of the flame, a controlling member having an operating position and a safety position, means for resetting said armature to attracted position and said controlling member to operating position, removable closure means for said last means, and a spring operative between said controlling member and said closure means for actuating said controlling member to operating position when the armature is in attracted position and the closure means is in place, said controlling member being actuated to safety position against the tension of said spring upon movement of the armature to retracted position with the closure means in place and being disposed in safety position when said closure means is removed with the armature in attracted position.

19. In combination, an electromagnet, a thermocouple adapted to be subjected to the heat of a flame and connected in circuit with said electromagnet to energize the same by the heat of the flame on the thermocouple, an armature adapted to be held attracted to said electromagnet when said electromagnet is energized by the heat of the flame on the thermocouple and operable to retracted position upon extinguishment of the flame, a controlling member having an operating position and a safety position, means for resetting said armature to attracted position and said controlling member to operating position, removable closure means for said last means, a spring operative between said controlling member and said closure means for actuating said controlling member to operating position when the armature is in attracted position and the closure means is in place, a stem connected to said armature, a sleeve on said stem and having abutment means for cooperation with said controlling member, and an abutment on said stem and cooperable with said sleeve to actuate said controlling member to safety position against the tension of said spring upon movement of the armature to retracted position with said closure means in place.

THOMAS T. ARDEN.